US011188465B1

(12) United States Patent
Kamand

(10) Patent No.: US 11,188,465 B1
(45) Date of Patent: Nov. 30, 2021

(54) CACHE MEMORY REPLACEMENT POLICY

(71) Applicant: SHENZHEN GOODIX TECHNOLOGY CO., LTD., Shenzhen (CN)

(72) Inventor: Bassam S Kamand, San Diego, CA (US)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/010,763

(22) Filed: Sep. 2, 2020

(51) Int. Cl.
*G06F 12/084* (2016.01)
*G06F 9/54* (2006.01)
*G06F 12/128* (2016.01)
*G06F 12/0846* (2016.01)

(52) U.S. Cl.
CPC ............ *G06F 12/084* (2013.01); *G06F 9/546* (2013.01); *G06F 12/0846* (2013.01); *G06F 12/128* (2013.01)

(58) Field of Classification Search
CPC .................................................... G06F 12/084
USPC ......................................................... 711/154
See application file for complete search history.

(56) References Cited

U.S. PATENT DOCUMENTS 4,426,682 A * 1/1984 Riffe .................... G06F 12/0891
711/135
10,585,594 B1 * 3/2020 Armangau ............ G06F 12/123

* cited by examiner

*Primary Examiner* — Jae U Yu
(74) *Attorney, Agent, or Firm* — Kilpatrick Townsend & Stockton LLP

(57) ABSTRACT

A cache memory is disclosed. The cache memory includes a plurality of ways, each way including an instruction memory portion, where the instruction memory portion includes a plurality of instruction memory locations configured to store instruction data encoding a plurality of CPU instructions. The cache memory also includes a controller configured to determine that each of a predetermined number of cache memory hit conditions have occurred, and a replacement policy circuit configured to identify one of the plurality of ways as having experienced a fewest quantity of hits of the predetermined number of cache memory hit conditions, where the controller is further configured to determine that a cache memory miss condition has occurred, and, in response to the miss condition, to cause instruction data retrieved from a RAM memory to be written to the instruction memory portion of the way identified by the replacement policy circuit.

20 Claims, 5 Drawing Sheets

CACHE MEMORY REPLACEMENT POLICY

FIELD OF THE INVENTION

The present application generally pertains to cache memories, and more particularly to cache memory replacement strategies.

BACKGROUND OF THE INVENTION

Cache memories are used in computer systems to reduce instruction access time for frequently used instructions. Central Processing Unit (CPU) executable instructions are stored in RAM, and are available for access by the CPU, as needed. Some, but not all, instructions, for example recently used instructions, are additionally stored in the cache memory. Because the cache memory is faster than RAM, the cache memory is preferred, and is used if the instruction needed by the CPU is stored therein. If the instruction needed by the CPU is not stored in the cache memory, the instruction is retrieved from the RAM. The instruction retrieved from RAM may then be stored in the cache memory according to a replacement policy. Improved replacement policies are needed in the art.

BRIEF SUMMARY OF THE INVENTION

One inventive aspect is an M way cache memory. The cache memory includes a plurality of ways, each way including an instruction memory portion, where the instruction memory portion includes a plurality of instruction memory locations configured to store instruction data encoding a plurality of CPU instructions. The cache memory also includes a controller configured to determine that each of a predetermined number of cache memory hit conditions have occurred, and a replacement policy circuit configured to identify one of the plurality of ways as having experienced a fewest quantity of hits of the predetermined number of cache memory hit conditions, where the controller is further configured to determine that a cache memory miss condition has occurred, and, in response to the miss condition, to cause instruction data retrieved from a RAM memory to be written to the instruction memory portion of the way identified by the replacement policy circuit.

In some embodiments, the replacement policy circuit is configured to store a quantity of hits each of the plurality of ways has experienced of the predetermined number of cache memory hit conditions.

In some embodiments, the replacement policy circuit includes a counter corresponding with each of the ways, where each corresponding counter is configured to maintain a count of the quantity of hits of the predetermined number of cache memory hit conditions the corresponding way has experienced.

In some embodiments, the replacement policy circuit includes an increment comparator corresponding with each of the ways, where each corresponding increment comparator is configured to, in response to the corresponding way experiencing a hit, cause the corresponding counter to increase the count of the quantity of hits of the predetermined number of cache memory hit conditions the corresponding way has experienced.

In some embodiments, the replacement policy circuit includes a decrement comparator corresponding with each of the ways, where each corresponding decrement comparator is configured to cause the corresponding counter to decrease the count of the quantity of hits of the predetermined number of cache memory hit conditions the corresponding way has experienced in response to a cache memory hit occurring which causes a hit experienced by the corresponding way to no longer be included in the predetermined number of cache memory hit conditions.

In some embodiments, the replacement policy circuit is configured to store data identifying the way having experienced the hit of each of the predetermined number of cache memory hit conditions.

In some embodiments, the replacement policy circuit includes a FIFO circuit configured to store data identifying the way having experienced the hit of each of the predetermined number of cache memory hit conditions.

In some embodiments, the replacement policy circuit includes a minimum count circuit configured to identify the one way as having experienced the fewest quantity of hits of the predetermined number of cache memory hit conditions by comparing the quantity of hits each of the ways has experienced of the predetermined number of cache memory hit conditions with one or more of the quantities of hits each of the other ways has experienced of the predetermined number of cache memory hit conditions.

In some embodiments, the cache memory miss condition occurred in response to a CPU address including a tag portion and an index portion, where the instruction data stored in the RAM memory at a location corresponding with the CPU address was not stored in any of the ways, and where the controller is further configured to cause the instruction data retrieved from the RAM memory to be written to the instruction memory portion of the way identified by the replacement policy circuit at a memory location identified by the index portion.

In some embodiments, each way further includes a tag memory portion, where the tag memory portion includes a plurality of tag memory locations configured to store tag data, where the controller is further configured to cause the tag portion of the CPU address to be written to the tag memory portion of the way identified by the replacement policy circuit at a memory location identified by the index portion.

Another inventive aspect is a method of using an M way cache memory. The method includes, with a plurality of ways, each way including an instruction memory portion, where the instruction memory portion includes a plurality of instruction memory locations, storing instruction data encoding a plurality of CPU instructions in the instruction memory locations of the ways. The method also includes, with a controller, determining that each of a predetermined number of cache memory hit conditions have occurred, with a replacement policy circuit, identifying one of the plurality of ways as having experienced a fewest quantity of hits of the predetermined number of cache memory hit conditions, with the controller, determining that a cache memory miss condition has occurred, and with the controller, in response to the miss condition, to causing instruction data retrieved from a RAM memory to be written to the instruction memory portion of the way identified by the replacement policy circuit.

In some embodiments, the method also includes, with the replacement policy circuit, storing a quantity of hits each of the plurality of ways has experienced of the predetermined number of cache memory hit conditions.

In some embodiments, the replacement policy circuit includes a counter corresponding with each of the ways, and the method further includes, with each corresponding counter, maintaining a count of the quantity of hits of the predetermined number of cache memory hit conditions the corresponding way has experienced.

In some embodiments, the replacement policy circuit includes an increment comparator corresponding with each of the ways, and the method further includes, with each corresponding increment comparator, in response to the corresponding way experiencing a hit, causing the corresponding counter to increase the count of the quantity of hits of the predetermined number of cache memory hit conditions the corresponding way has experienced.

In some embodiments, the replacement policy circuit includes a decrement comparator corresponding with each of the ways, and the method further includes, with each corresponding decrement comparator, causing the corresponding counter to decrease the count of the quantity of hits of the predetermined number of cache memory hit conditions the corresponding way has experienced in response to a cache memory hit occurring which causes a hit experienced by the corresponding way to no longer be included in the predetermined number of cache memory hit conditions.

In some embodiments, the method also includes, with the replacement policy circuit, storing data identifying the way having experienced the hit of each of the predetermined number of cache memory hit conditions.

In some embodiments, the replacement policy circuit includes a FIFO circuit, and the method further includes, with the FIFO circuit, storing data identifying the way having experienced the hit of each of the predetermined number of cache memory hit conditions.

In some embodiments, the replacement policy circuit includes a minimum count circuit, and the method further includes, with the minimum count circuit, identifying the one way as having experienced the fewest quantity of hits of the predetermined number of cache memory hit conditions by comparing the quantity of hits each of the ways has experienced of the predetermined number of cache memory hit conditions with one or more of the quantities of hits each of the other ways has experienced of the predetermined number of cache memory hit conditions.

In some embodiments, the cache memory miss condition occurred in response to a CPU address including a tag portion and an index portion, and the instruction data stored in the RAM memory at a location corresponding with the CPU address was not stored in any of the ways, and the method further includes, with the controller, causing the instruction data retrieved from the RAM memory to be written to the instruction memory portion of the way identified by the replacement policy circuit at a memory location identified by the index portion.

In some embodiments, each way further includes a tag memory portion, where each tag memory portion includes a plurality of tag memory locations configured to store tag data encoding a plurality of RAM memory address ranges the CPU instructions are stored in, where the method further includes, with the controller causing the tag portion of the CPU address to be written to the tag memory portion of the way identified by the replacement policy circuit at a memory location identified by the index portion.

DETAILED DESCRIPTION OF THE INVENTION

Particular embodiments of the invention are illustrated herein in conjunction with the drawings.

Various details are set forth herein as they relate to certain embodiments. However, the invention can also be implemented in ways which are different from those described herein. Modifications can be made to the discussed embodiments by those skilled in the art without departing from the invention. Therefore, the invention is not limited to particular embodiments disclosed herein.

Figure 1:
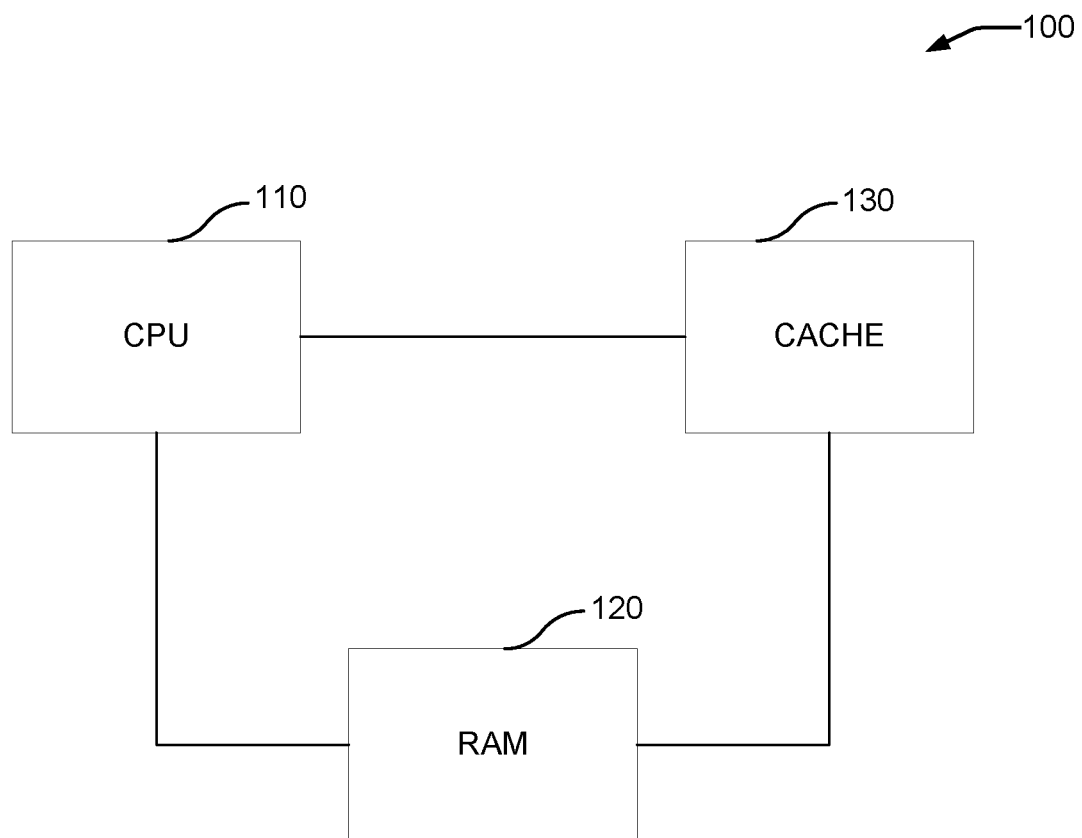
FIG. 1 is a schematic block diagram illustrating a computer system

FIG. 1 is a schematic illustration of a computer system 100. Computer system 100 includes CPU 110, random access memory (RAM) 120, and cache memory 130.

The information stored in a cache memory 130 includes instructions which the CPU 110 may need for executing a software application. The information stored in the cache memory 130 also includes information for each particular instruction identifying a portion or address range of the RAM 120 the particular instruction is stored in. The identifying information is called a tag. Other information, such as an offset, may additionally be stored in the cache memory, as understood by those of skill in the art.

As understood by those of skill in the art, in computer systems, cache memories may be subdivided into multiple ways, where each way is independently written and read. To fetch an instruction from the cache memory, the CPU provides an address to the cache memory. The CPU address includes a tag portion and an index portion. In some embodiments, the CPU address may additionally include other information, such as an offset, as understood by those of skill in the art.

In some cache memories, the index portion of the CPU address is used to read one instruction and its corresponding tag from each of the ways. Accordingly, a number of instructions corresponding to the number of ways, along with each of their corresponding tags, are read from the cache memory based on the index portion of the CPU address.

In some cache memories, the tags associated with the instructions are each compared to the tag portion of the CPU address. If one of the tags matches the tag portion of the CPU address, the instruction corresponding with the matching tag is provided to the CPU as the instruction requested by the CPU. If none of the tags match the tag portion of the CPU address, the instruction requested by the CPU is not located in the cache memory, and must, instead, be retrieved from RAM.

When an instruction requested by the CPU is not available in the cache memory, the instruction is fetched from RAM. In addition the instruction fetched from RAM may be written to the cache memory so as to be available for subsequent requests from the CPU. The instruction to be written to the cache memory may be written to a particular identified one of the M ways of the memory, at a location specified by the index portion of the CPU address.

Which of the M ways the instruction is to be written to, may be determined based on a cache memory replacements policy having attributes discussed in further detail, below.

Figure 2:
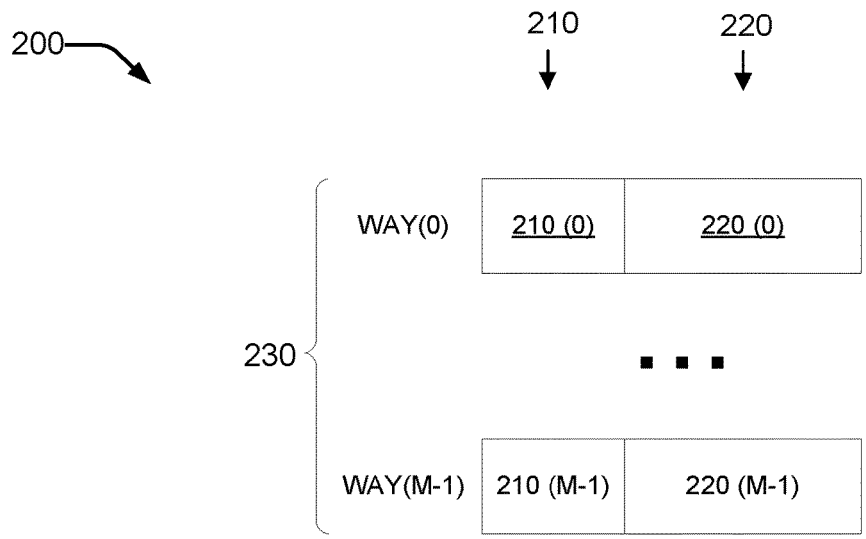
FIG. 2 is a schematic illustration of a cache memory according to some embodiments.

FIG. 2 is a schematic illustration of a cache memory 200 according to some embodiments. Cache memory 200 may be used in computer system 100 as cache memory 130. Cache memory 200 includes M ways 230, where each way includes a tag memory portion 210 and an instruction memory portion 220.

In some embodiments, the ways of cache memory 200 include one or more other memory portions, as understood by those of skill in the art. For example, in some embodiments, each way includes a valid bit portion, where each bit in the valid bit portion indicates whether a particular instruction is valid, as understood by those of skill in the art.

Instruction memory portion 220 is written with data corresponding with CPU instructions according to the replacement policy. In addition, tag memory portion 210 is written with data corresponding with portions or address ranges of the RAM the instructions are stored in.

Instruction memory portion 220 may include one or more memory circuits, despite being abstractly or conceptually segmented into the M ways. Accordingly, instruction memory portion 220 may include one or more memory cell arrays, which each receive signals from and provide signals to a number of peripheral circuits which are used to access the memory cells for writing and for reading instruction information. As understood by those of skill in the art, the peripheral circuits may include, for example, an address decoder, sense amplifiers, a column multiplexer, and output buffers. In some embodiments, the peripheral circuits may include one or more other circuits. The memory cells are each constituent to a particular one of the ways. The peripheral circuits, however, may each receive signals from or provide signals to memory cells of one or more of the ways.

Tag memory portion 210 may include one or more memory circuits. Accordingly, each way includes an array of memory cells which receives signals from and provides signals to a number of peripheral circuits, which are used to access the memory cells for writing and for reading tag information. As understood by those of skill in the art, the peripheral circuits may include, for example, an address decoder, sense amplifiers, a column multiplexer, and output buffers. In some embodiments, the peripheral circuits may include one or more other circuits. The memory cells and the peripheral circuits are each constituent to a particular one of the ways.

Cache memory 200 is structured so that, to fetch an instruction therefrom, the CPU (e.g. CPU 110) provides an address to the cache memory 200. The CPU address includes a tag portion and an index portion. In some embodiments, the CPU address may additionally include other information, such as an offset, as understood by those of skill in the art.

The index portion of the CPU address identifies a memory location in each of the tag memory portions 210(0) to 210(M-1) of the M ways. The M tag memory portions 210(0) to 210(M-1) are each associated with a memory location in a corresponding one of the instruction memory portions 220(0) to 220(M-1) of the M ways. The association of the M tag memory portions 210(0) to 210(M-1) and the instruction memory portions 220(0) to 220(M-1) of the M ways is instantiated in hardware at least by each of the M tag memory portions 210(0) to 210(M-1) and its associated instruction memory portion 220(0) to 220(M-1) having an address partially or wholly identified by the index portion of the CPU address.

The M tag memory portions 210(0) to 210(M-1) identified by the index portion of the CPU address are read to retrieve M tags. The M tags are each compared with the tag portion of the CPU address. If one of the M tags matches the tag portion of the CPU address, a cache hit condition is identified, and the way having the matching tag is specified. Subsequently, the index portion of the CPU address is used to read an instruction from the instruction memory portion 220($x$) of the identified way. The instruction read from the instruction memory portion 220($x$) of the identified way is returned to the CPU as the instruction requested by the CPU.

If none of the tags matches the tag portion of the CPU address, the instruction requested by the CPU is not located in the cache memory, a cache miss condition is identified, and the instruction requested by the CPU must be retrieved from RAM.

In addition, in some embodiments, the instruction requested by the CPU is also written to a memory location in one of the instruction memory portions 220(0) to 220(M-1) of the M ways of the cache memory, and the tag portion of the CPU address, which was not matched to the previously stored M tags, is written to the corresponding tag memory portion 210(0) to 210(M-1).

Which of the M instruction memory portions 220(0) to 220(M-1) and M tag memory portion 210(0) to 210(M-1) store the requested CPU instruction and the corresponding tag is identified by a cache memory replacement policy. The specific memory location of the identified memory portion and tag memory portion is identified by the index portion of the CPU address.

Figure 3:
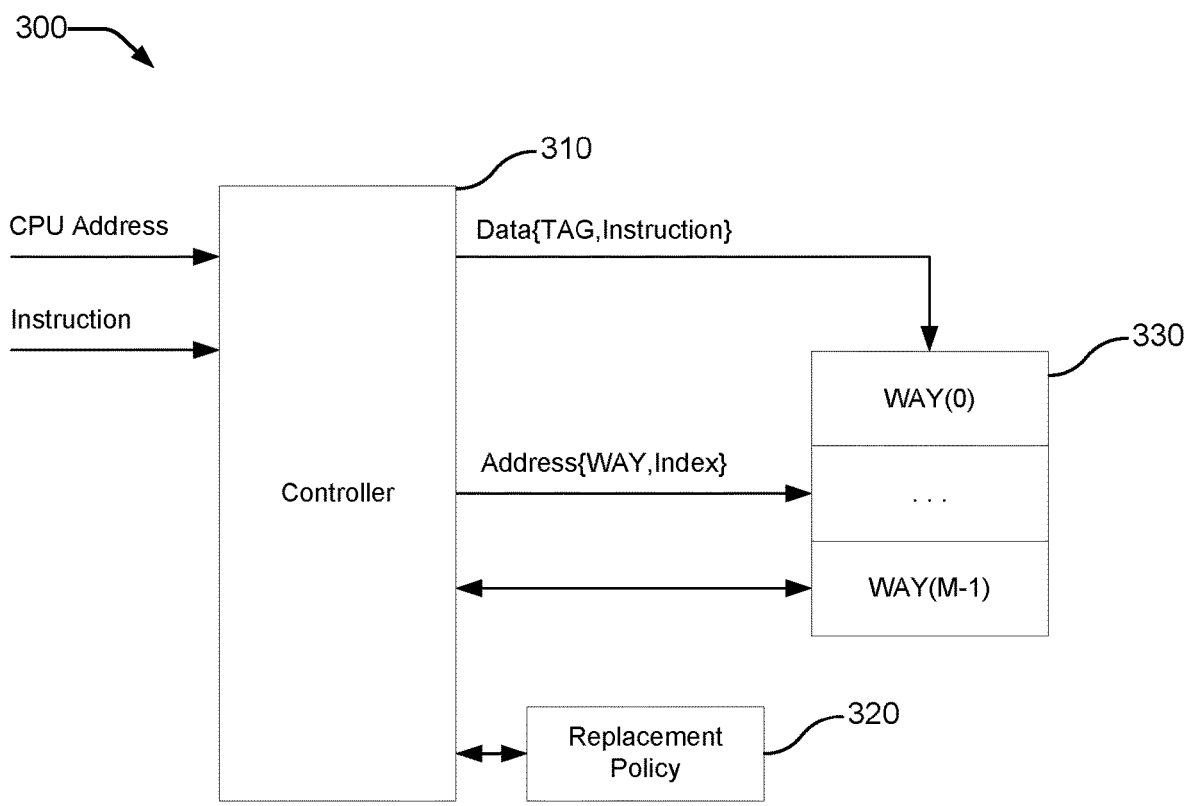
FIG. 3 is a schematic illustration of a cache memory system according to some embodiments.

FIG. 3 is a schematic illustration of a write functionality portion of a cache memory 300 according to some embodiments.

Cache memory 300 includes controller 310, replacement policy circuit 320, and memory portion 330.

In response to the instruction requested by the CPU not being located in the cache memory, controller 310 causes the instruction requested by the CPU, once retrieved from RAM, to be written to memory portion 330 along with the corresponding tag data of the instruction.

The controller 310 receives the tag data to be written from the CPU address as part of the failed attempt to fetch the instruction from the cache memory. In addition, the controller 310 receives the instruction data retrieved from RAM in response to the cache memory miss condition.

In addition, the controller 310 provides the tag data and the instruction data to memory portion 330 as data to be written.

For the address information for writing to the memory portion 330, the controller 310 receives the index portion of the CPU address as part of the failed attempt to fetch the instruction from the cache memory, and receives the WAY data from the replacement policy circuit 320 in response to the cache memory miss condition.

In addition, the controller 310 provides the WAY data and the index data to memory portion 330 as the address to which the data is to be written. Controller 310 also provides an indication to memory portion 330, in response to which, the tag data and the instruction data are written to a memory location specified by the WAY data and the index data.

The replacement policy circuit 320 may be configured to implement a replacement policy according to a desired replacement policy protocol. For example, replacement policy circuit 320 may be configured to determine which of the M ways has been used least, or which of the M ways has been used least during a most recent period.

In some embodiments, a way is "used," for the purpose of the replacement policy circuit, each time an instruction is fetched from the particular way. In some embodiments, the period may be determined based on a predetermined number of cache memory hits. For example, the replacement policy circuit may keep track of the number of hits for each way out of the predetermined number of cache memory hits.

Figure 4:
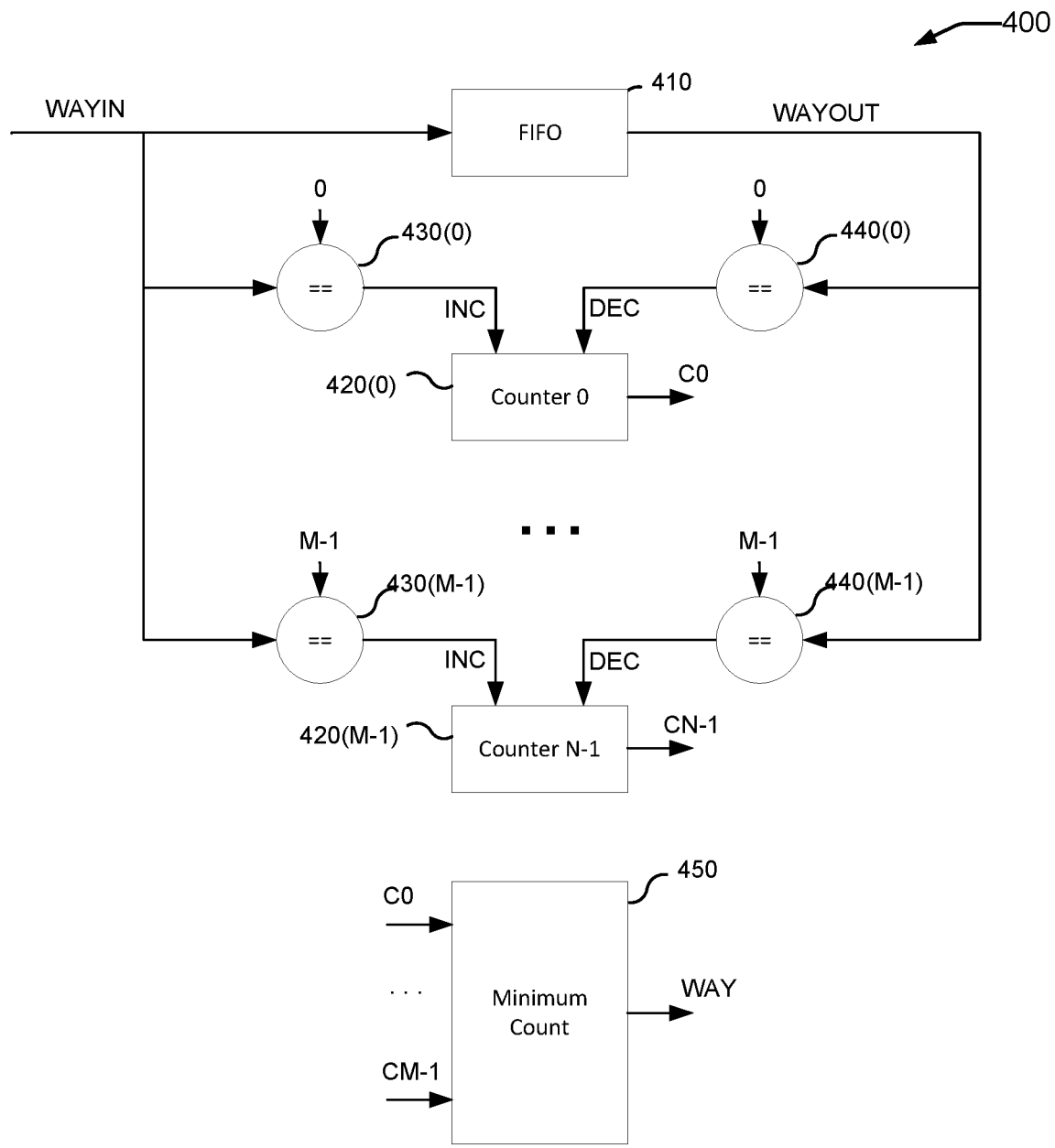
FIG. 4 is a schematic illustration of a replacement policy circuit according to some embodiments.

FIG. 4 is a schematic illustration of a replacement policy circuit 400. Replacement policy circuit 400 may be used as replacement policy circuit 320 of FIG. 3. In some embodiments, replacement policy circuit 400 may be used in cache memories other than that illustrated in FIG. 3. In some embodiments, replacement policy circuits other than replacement policy circuit 400 may be used in the cache memory illustrated in FIG. 3. Replacement policy circuit 400 is configured to identify which of the M ways an instruction and associated tag is to be written to.

Replacement policy circuit 400 includes history FIFO 410, way counters 420(0) through 420(M-1), increment comparators 430(0) through 430(M-1), decrement comparators 440(0) through 440(M-1), and minimum count circuit 450.

FIFO 410 may have a depth related to the number of ways (M). For example, the depth of FIFO 410 may be equal to a constant times M. For example, the depth of FIFO 410 may be equal to M times a constant which is a power of 2. In some embodiments, the depth of FIFO 410 is equal to M times 32, 64, 128, 256, 512, or 1024.

The depth of the FIFO 410 corresponds with the predetermined number of cache memory hits for which replacement policy circuit 400 keeps track of the number of hits for each particular way. For example, if the depth of FIFO 410 is equal to M times 128, replacement policy circuit 400 keeps track of the number of hits for each particular way over the most recent M×128 cache memory hits, regardless of which way each hit was for.

Each time a cache memory hit occurs, data identifying the way of the hit is written to FIFO 410. Accordingly, once the FIFO 410 is full, FIFO 410 stores data identifying the way for each of the most recent M×128 cache memory hits.

Way counters 420(0) through 420(M-1) are each configured to keep track of the number of hits for one of the ways out of the predetermined number of cache memory hits. For example, if the depth of FIFO 410 is equal to M×128, and the FIFO 410 is full, the way counters 420(0) through 420(M-1) is respectively configured to keep track of how many of the most recent M×128 cache memory hits occurred for way(0) through way(M-1).

The size of way counters 420(0) through 420(M-1) may accommodate a count of the depth of FIFO 410 divided by M. Other counter sizes may alternatively be used.

Each time a cache memory hit occurs, data identifying the way of the hit at input WAYIN is written to FIFO 410. In addition, each time a cache memory hit occurs, the data identifying the way of the hit is provided to each of increment comparators 430(0) through 430(M-1). Because each of the ways corresponds with one of the increment comparators 430(0) through 430(M-1), a particular one of the increment comparators 430(0) through 430(M-1) generates an increment signal indicating that the data identifying the way of the hit is equal to the way with which the particular one increment comparator corresponds. Accordingly, each time a hit occurs for a particular way, the particular increment comparator corresponding with the particular way, generates an increment signal.

Each time a cache memory hit occurs, data identifying the way of the hit at input WAYIN is written to FIFO 410. In addition, each time a cache memory hit occurs, the stored data identifying the way of the oldest or least recent hit at FIFO 410 output WAYOUT is provided to each of decrement comparators 440(0) through 440(M-1). Because each of the ways corresponds with one of the decrement comparators 440(0) through 440(M-1), a particular one of the decrement comparators 440(0) through 440(M-1) generates a decrement signal indicating that the stored data identifying the way of the oldest or least recent hit is equal to the way with which the particular one decrement comparator corresponds. Accordingly, each time an oldest or least recent hit occurs for a particular way, and is, therefore, lost from the FIFO 410, the particular decrement comparator corresponding with the particular way, generates an decrement signal.

As illustrated, each of the increment comparators 430(0) through 430(M-1) is connected with a corresponding one of the way counters 420(0) through 420(M-1). In addition, each of the decrement comparators 440(0) through 440(M-1) is connected with a corresponding one of the way counters 420(0) through 420(M-1).

Way counters 420(0) through 420(M-1) each comprise a memory configured to store a count equal to the number of received increment signals minus the number of decrement signals. Accordingly, each of the way counters 420(0) through 420(M-1) keeps track of the number of hits for each particular way over the most recent him memory hits, where the number corresponds with the depth of the FIFO 410.

Minimum count circuit 450 receives count data from each of the way counters 420(0) through 420(M-1), and generates data at output WAY identifying the way corresponding with the particular way counter of way counters 420(0) through 420(M-1) having the minimum count value.

Referring again to FIG. 3, in response to an instruction requested by the CPU not being located in the cache memory, controller 310 causes the instruction requested by the CPU to be written to memory portion 330 along with the corresponding tag data of the instruction, where the controller 310 receives the tag data to be written from the CPU address as part of the failed attempt to fetch the instruction from the cache memory, and where the controller 310 receives the instruction data retrieved from RAM.

In addition, the controller 310 provides the WAY data from the replacement policy circuit 320, and the index portion of the CPU address of the failed cache memory fetch attempt to memory portion 330 as the address to which the instruction and tag data are to be written. Accordingly, controller 310 causes the instruction fetched from RAM along with its corresponding tag data to the way identified by replacement policy circuit 320 at a location in the identified way specified by the index of the CPU address of the failed cache memory fetch attempt.

Minimum count circuit 450 may be implemented in any of a number of circuits known to those of skill in the art. For example, minimum count circuit may comprise log 2(M) comparator stages, and log 2(M)-1 multiplexer stages. The first comparator stage has M/2 comparators, each configured to compare the value of two of the way counters 420(0) through 420(M-1). The first multiplexer stage has M/2 multiplexers, each configured to pass the value of one of the two way counter values which were compared by a corresponding one of the comparators, where which of the two way counter values is passed is determined by the output of the corresponding comparator. The next comparator stage has M/2/2 comparators, each configured to compare the value of two of the way counter values passed by two of the multiplexers of the first multiplexer stage. The first multiplexer stage has M/2/2 multiplexers, each configured to pass the value of one of the two way counter values which were compared by a corresponding one of the comparators of the next comparator stage, where which of the two way counter values is passed is determined by the output of the corresponding comparator. The last comparator stage has one comparator, configured to compare the value of the two way counter values having been passed by the log 2(M)-1 multiplexer stages.

The WAY data identifying the way corresponding with the way counter having the minimum count value is encoded in the outputs of all of the comparators which compared the minimum way counter value. The last comparator stage output may correspond with the MSB of the WAY data identifying the minimum count way, and the comparator output of the first comparator comparing the minimum count may correspond with the LSB of the WAY data identifying the minimum count way.

Figure 5:
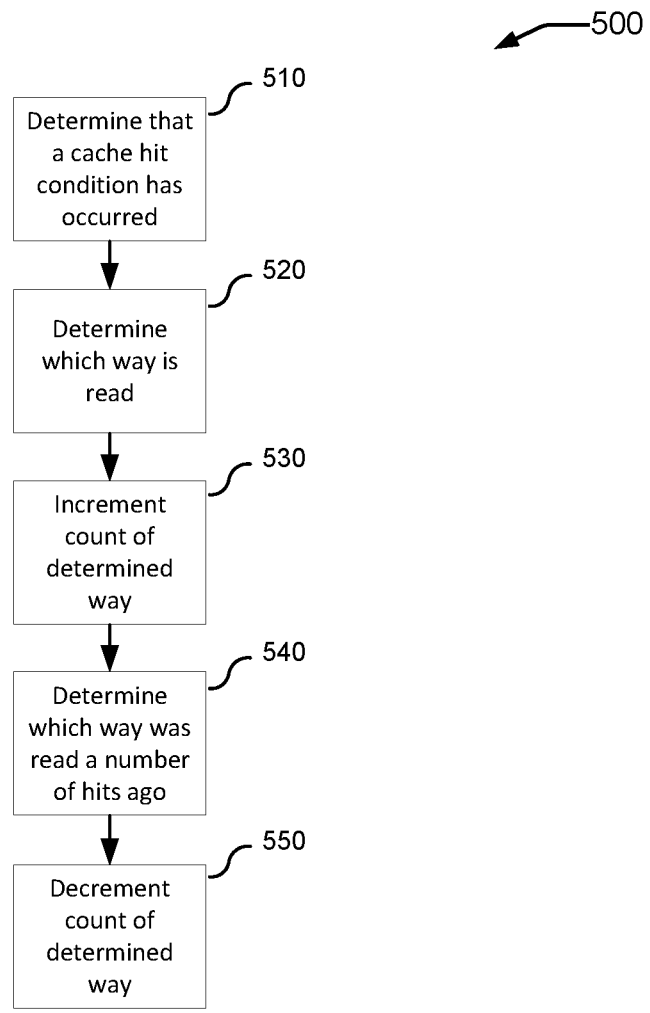
FIG. 5 illustrates a flowchart diagram illustrating a method of using a cache memory.

FIG. 5 illustrates a flowchart diagram illustrating a method 500 of using a cache memory. The method 500 may be performed, for example, by the circuits and components illustrated, and discussed above with reference to FIGS. 2, 3, and 4. The method 500 may be performed by other cache memory circuits, as understood by those of skill in the art. In addition, the circuits and components illustrated and discussed above with reference to FIGS. 2, 3, and 4 may perform alternative methods having features similar or identical to those discussed with reference to method 500.

At 510, a controller determines that a cache memory hit condition has occurred, where a CPU address comprising a tag and an index referencing a RAM memory location storing a requested instruction is used to retrieve the requested instruction from a first particular way in the cache memory.

At 520, the controller identifies the first particular way from which the requested instruction is read.

At 530, a replacement policy circuit increments a count representing the number of hits the first particular way has experienced over a most recent predetermined number of cache memory hits of the cache memory.

At 540, the controller identifies a second particular way having experienced the oldest or least recent hit of the most recent predetermined number of cache memory hits of the cache memory.

At 560, a replacement policy circuit decrements a count representing the number of hits the second particular way has experienced over the most recent predetermined number of cache memory hits of the cache memory.

In some embodiments, the first particular way is the same as the second particular way.

In some embodiments, the method 500 also includes identifying which of the ways is associated with the lowest count representing the number of experienced hits of the most recent predetermined number of cache memory hits.

Figure 6:
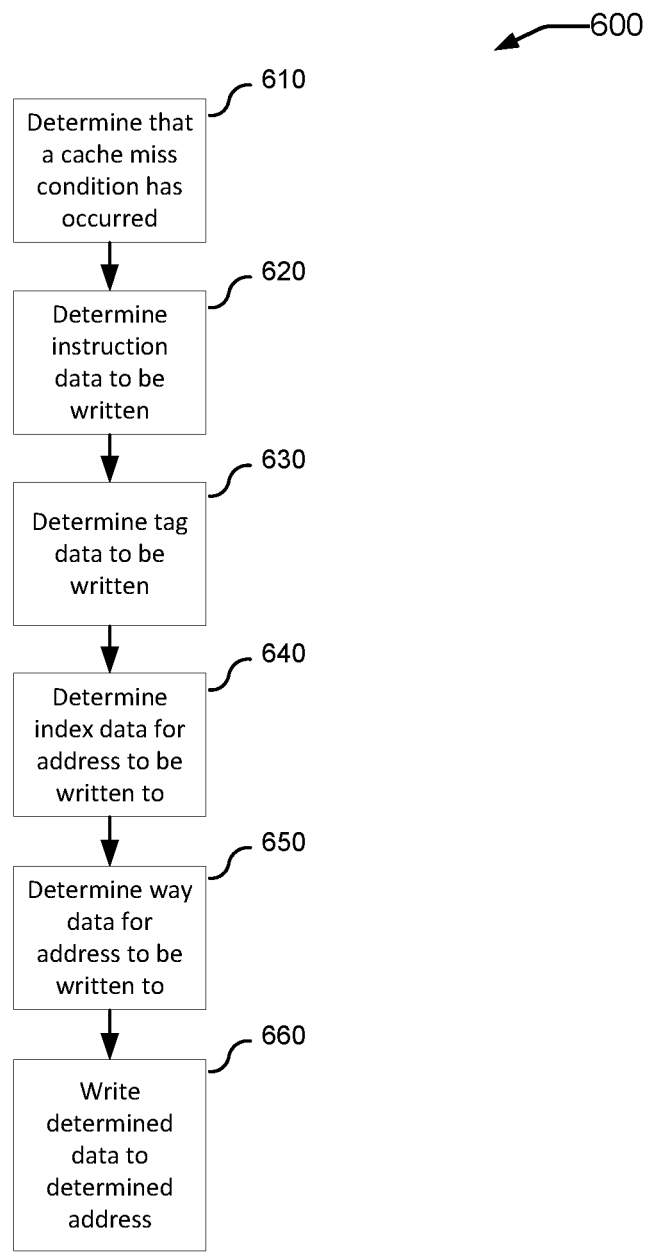
FIG. 6 illustrates a flowchart diagram illustrating a method of using a cache memory.

FIG. 6 illustrates a flowchart diagram illustrating a method of using a cache memory. The method 500 may be performed, for example, by the circuits and components illustrated, and discussed above with reference to FIGS. 2, 3, and 4. The method 600 may be performed by other cache memory circuits, as understood by those of skill in the art. In addition, the circuits and components illustrated and discussed above with reference to FIGS. 2, 3, and 4 may perform alternative methods having features similar or identical to those discussed with reference to method 600.

At 610, a controller determines that a cache memory miss condition has occurred, where a CPU address comprising a tag and an index referencing a RAM memory location storing a requested instruction cannot be used to retrieve the requested instruction from the cache memory, for example, because the requested instruction is not stored in the cache memory. In response to the miss, the requested instruction is retrieved from the referenced RAM memory location, and provided to the controller, so that the requested instruction may be stored in the cache memory for subsequent requests.

At 620, the instruction data corresponding with the instruction is determined, so that the instruction data can be written to the cache memory. For example, the controller may determine the instruction based on the instruction data retrieved from the referenced RAM memory location.

At 630, the tag data corresponding with the instruction is determined, so that the tag data can be written to the cache memory. For example, the controller may determine the tag data based on the tag information of the CPU address referencing the RAM memory location of the requested instruction.

At 640, the index data corresponding with the instruction is determined, so that the index data can be used as address information for writing the instruction data and the tag data to the cache memory. For example, the controller may determine the index data based on the index information of the CPU address referencing the RAM memory location of the requested instruction.

At 650, the way data corresponding with the way to which the instruction data and the tag data are to be written is determined. For example, the controller may receive the way data from a replacement policy circuit, configured to determine which of the ways has experienced the fewest hits of the most recent predetermined number of cache memory hits of the cache memory, where the way data identifies the way determined by the replacement policy circuit.

At 660, the tag data and instruction data are written to the cache memory. For example, the controller may cause the tag data and instruction data to be written to the way of the cache memory identified by the way data at a location identified by the index data.

In some embodiments, the method 600 additionally includes one or more actions discussed with reference to method 500 of FIG. 5.

Though the present invention is disclosed by way of specific embodiments as described above, those embodiments are not intended to limit the present invention. Based on the methods and the technical aspects disclosed herein, variations and changes may be made to the presented embodiments by those of skill in the art without departing from the spirit and the scope of the present invention.

What is claimed is:

1. An M way cache memory, comprising:
    a plurality of ways, each way comprising an instruction memory portion, wherein the instruction memory portion comprises a plurality of instruction memory locations configured to store instruction data encoding a plurality of CPU instructions;
    a controller configured to determine that each of a predetermined number of cache memory hit conditions have occurred; and
    a replacement policy circuit configured to identify one of the plurality of ways as having experienced a fewest quantity of hits of the predetermined number of cache memory hit conditions,
    wherein the controller is further configured to determine that a cache memory miss condition has occurred, and, in response to the miss condition, to cause instruction data retrieved from a RAM memory to be written to the instruction memory portion of the way identified by the replacement policy circuit.

2. The cache memory of claim 1, wherein the replacement policy circuit is configured to store a quantity of hits each of the plurality of ways has experienced of the predetermined number of cache memory hit conditions.

3. The cache memory of claim 2, wherein the replacement policy circuit comprises a counter corresponding with each of the ways, wherein each corresponding counter is configured to maintain a count of the quantity of hits of the predetermined number of cache memory hit conditions the corresponding way has experienced.

4. The cache memory of claim 3, wherein the replacement policy circuit comprises an increment comparator corresponding with each of the ways, wherein each corresponding increment comparator is configured to, in response to the corresponding way experiencing a hit, cause the corresponding counter to increase the count of the quantity of hits of the predetermined number of cache memory hit conditions the corresponding way has experienced.

5. The cache memory of claim 3, wherein the replacement policy circuit comprises a decrement comparator corresponding with each of the ways, wherein each corresponding decrement comparator is configured to cause the corresponding counter to decrease the count of the quantity of hits of the predetermined number of cache memory hit conditions the corresponding way has experienced in response to a cache memory hit occurring which causes a hit experienced by the corresponding way to no longer be included in the predetermined number of cache memory hit conditions.

6. The cache memory of claim 1, wherein the replacement policy circuit is configured to store data identifying the way having experienced the hit of each of the predetermined number of cache memory hit conditions.

7. The cache memory of claim 6, wherein the replacement policy circuit comprises a FIFO circuit configured to store data identifying the way having experienced the hit of each of the predetermined number of cache memory hit conditions.

8. The cache memory of claim 1, wherein the replacement policy circuit comprises a minimum count circuit configured to identify the one way as having experienced the fewest quantity of hits of the predetermined number of cache memory hit conditions by comparing the quantity of hits each of the ways has experienced of the predetermined number of cache memory hit conditions with one or more of the quantities of hits each of the other ways has experienced of the predetermined number of cache memory hit conditions.

9. The cache memory of claim 1, wherein the cache memory miss condition occurred in response to a CPU address comprising a tag portion and an index portion, and wherein the instruction data stored in the RAM memory at a location corresponding with the CPU address was not stored in any of the ways, and wherein the controller is further configured to cause the instruction data retrieved from the RAM memory to be written to the instruction memory portion of the way identified by the replacement policy circuit at a memory location identified by the index portion.

10. The cache memory of claim 9, wherein each way further comprises a tag memory portion, wherein the tag memory portion comprises a plurality of tag memory locations configured to store tag data, wherein the controller is further configured to cause the tag portion of the CPU address to be written to the tag memory portion of the way identified by the replacement policy circuit at a memory location identified by the index portion.

11. A method of using an M way cache memory, the method comprising:
with a plurality of ways, each way comprising an instruction memory portion, wherein the instruction memory portion comprises a plurality of instruction memory locations, storing instruction data encoding a plurality of CPU instructions in the instruction memory locations of the ways;
with a controller, determining that each of a predetermined number of cache memory hit conditions have occurred;
with a replacement policy circuit, identifying one of the plurality of ways as having experienced a fewest quantity of hits of the predetermined number of cache memory hit conditions;
with the controller, determining that a cache memory miss condition has occurred; and
with the controller, in response to the miss condition, to causing instruction data retrieved from a RAM memory to be written to the instruction memory portion of the way identified by the replacement policy circuit.

12. The method of claim 11, further comprising, with the replacement policy circuit, storing a quantity of hits each of the plurality of ways has experienced of the predetermined number of cache memory hit conditions.

13. The method of claim 12, wherein the replacement policy circuit comprises a counter corresponding with each of the ways, and wherein the method further comprises, with each corresponding counter, maintaining a count of the quantity of hits of the predetermined number of cache memory hit conditions the corresponding way has experienced.

14. The method of claim 13, wherein the replacement policy circuit comprises an increment comparator corresponding with each of the ways, and wherein the method further comprises, with each corresponding increment comparator, in response to the corresponding way experiencing a hit, causing the corresponding counter to increase the count of the quantity of hits of the predetermined number of cache memory hit conditions the corresponding way has experienced.

15. The method of claim 13, wherein the replacement policy circuit comprises a decrement comparator corresponding with each of the ways, and wherein the method further comprises, with each corresponding decrement comparator, causing the corresponding counter to decrease the count of the quantity of hits of the predetermined number of cache memory hit conditions the corresponding way has experienced in response to a cache memory hit occurring which causes a hit experienced by the corresponding way to no longer be included in the predetermined number of cache memory hit conditions.

16. The method of claim 11, further comprising, with the replacement policy circuit, storing data identifying the way having experienced the hit of each of the predetermined number of cache memory hit conditions.

17. The method of claim 16, wherein the replacement policy circuit comprises a FIFO circuit, and the method further comprises, with the FIFO circuit, storing data identifying the way having experienced the hit of each of the predetermined number of cache memory hit conditions.

18. The method of claim 11, wherein the replacement policy circuit comprises a minimum count circuit, and the method further comprises, with the minimum count circuit, identifying the one way as having experienced the fewest quantity of hits of the predetermined number of cache memory hit conditions by comparing the quantity of hits each of the ways has experienced of the predetermined number of cache memory hit conditions with one or more of the quantities of hits each of the other ways has experienced of the predetermined number of cache memory hit conditions.

19. The method of claim 11, wherein the cache memory miss condition occurred in response to a CPU address comprising a tag portion and an index portion, and wherein the instruction data stored in the RAM memory at a location corresponding with the CPU address was not stored in any of the ways, and wherein the method further comprises, with the controller, causing the instruction data retrieved from the RAM memory to be written to the instruction memory portion of the way identified by the replacement policy circuit at a memory location identified by the index portion.

20. The method of claim 19, wherein each way further comprises a tag memory portion, wherein each tag memory portion comprises a plurality of tag memory locations configured to store tag data encoding a plurality of RAM memory address ranges the CPU instructions are stored in, wherein the method further comprises, with the controller causing the tag portion of the CPU address to be written to the tag memory portion of the way identified by the replacement policy circuit at a memory location identified by the index portion.

* * * * *